May 7, 1963 A. L. DI MATTIA ETAL 3,088,743

UNIVERSAL MOUNT FOR STYLUS ASSEMBLY

Filed Nov. 2, 1960 3 Sheets-Sheet 1

INVENTORS
ALFRED L. DI MATTIA
EDWARD KAULINS
BY
Amster & Levy
ATTORNEYS

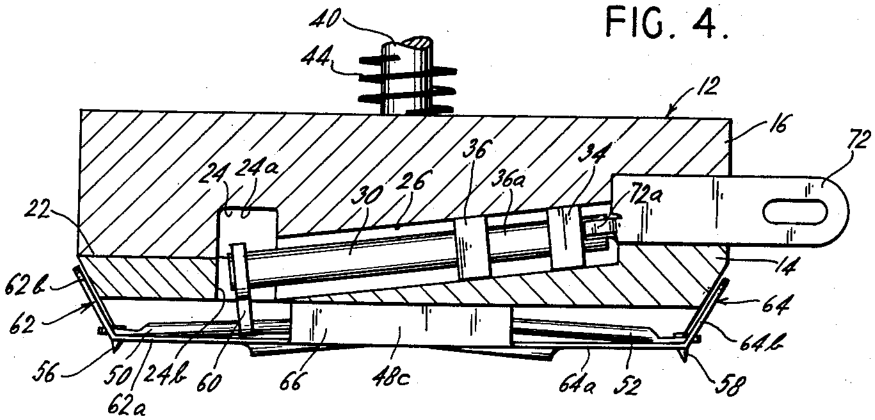
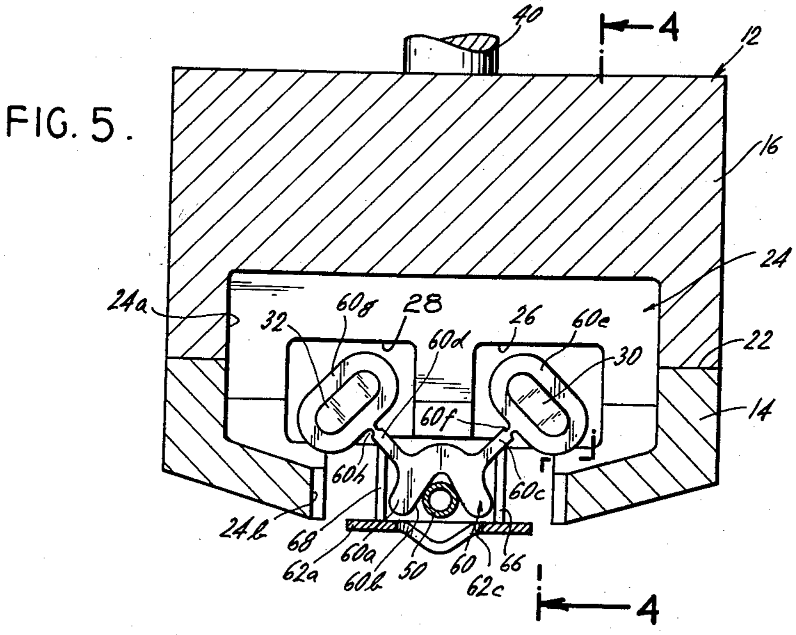
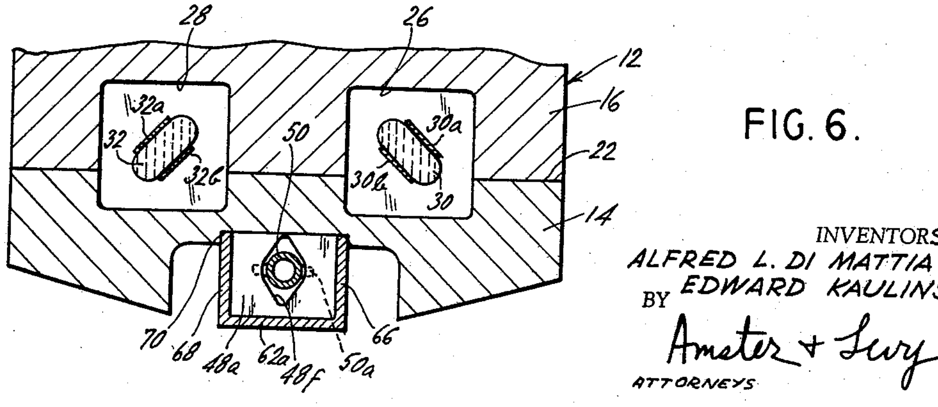
FIG. 6.
INVENTORS
ALFRED L. DI MATTIA
EDWARD KAULINS
BY Amster + Levy
ATTORNEYS

UNIVERSAL MOUNT FOR STYLUS ASSEMBLY

Filed Nov. 2, 1960 3 Sheets-Sheet 3

INVENTORS
ALFRED L. DI MATTIA
EDWARD KAULINS
BY Amster & Levy
ATTORNEYS

United States Patent Office 3,088,743
Patented May 7, 1963

3,088,743

UNIVERSAL MOUNT FOR STYLUS ASSEMBLY

Alfred L. Di Mattia, Fairfield, and Edward Kaulins, Norwalk, Conn., assignors, by mesne assignments, to Zenith Radio Corporation, Chicago, Ill., a corporation of Delaware Filed Nov. 2, 1960, Ser. No. 66,738
10 Claims. (Cl. 274—36)

The present invention relates generally to electromechanical transducers, and in particular to an improved universal mount for a stylus lever or levers of an electromechanical transducer, for example, a phonograph cartridge suitable for playback of both stereophonic and monophonic recordings.

Electromechanical transducers for the playback of stereophonic and/or monophonic discs or records usually incorporate one or more stylus levers each carrying an appropriate stylus mounted for universal movement such as to track the record groove. In a typical turret type of stylus assembly suitable for ready changeover from 33⅓–45 r.p.m. recordings to 78 r.p.m. recordings there are provided first and second stylus levers which extend in opposite directions. The stylus levers are mounted for movement in response to motion imparted thereto in response to playback of the stereophonic or monophonic records. A rotatable turret or mount is provided for the stylus assembly such that the same may be rotated to bring either of the stylus levers into an operative position wherein the stylus lever is coupled to one or more transducers for flexing the same as functions of the related modulation. In a typical arrangement, a yoke or coupler is arranged to engage either one of the stylus levers when in the operative position, with the yoke being coupled to the one or more transducers to produce a flexing or stressing of such transducers.

In such stylus assemblies, it is important that the stylus lever or levers have a substantially equal compliance in all directions of motion, particularly for stereophonic recordings wherein the stylus moves in a complex path as a function of the two channels of information on the stereophonic disc. Further, it is important that the stylus lever or levers have a generally high order of compliance to assure the high fidelity reproduction of the one or more channels of information. In particular, with a turret type of transducer or cartridge, it is important that only a small restoring force be required to bring the stylus levers back to their normal position such that the stylus levers properly engage the yoke or coupler of the transducer when in the operative position. A still further requirement is that there be substantially no tendency for the stylus lever or levers to rotate about their longitudinal axis and assume positions which are tilted or canted, whereby the ones or more styli are brought out of a position substantially normal to the record surface.

Broadly, it is an object of the present invention to provide an electromechanical transducer for either monophonic or stereophonic disc recordings of sound which realize one or more of the aforesaid advantages. Specifically, it is within the contemplation of the present invention to provide an improved universal mount for the stylus lever or levers of an electro-mechanical transducer which has a substantially equal compliance in all directions of motion and is capable of producing high fidelity reproductions of recorded information.

A still further object of the present invention is to provide an improved stylus lever mount which finds particular application in a turret type of stylus assembly which enables the virtually instantaneous change-over of the styli thereof to enable the playback of 33⅓–45 r.p.m. records and 78 r.p.m. records.

In accordance with an illustrative embodiment demonstrating product aspects of the present invention, there is provided a universal mount for stylus lever of an electromechanical transducer which comprises a support defining a cavity including a wall formed with an elongated opening. The stylus lever includes an elongated lever arm terminating at one end in an ear of a greater lateral extent than the lever arm and carries a stylus at the end remote from the ear. The stylus is oriented for playback of a record when the ear extends substantially transverse to the elongated opening provided in the support. The ear is disposed within the cavity and has a transverse extent which is greater than the transverse extent of the opening to preclude withdrawal from the cavity when the stylus is oriented for playback. The universal mount or assembly is completed by the provision of a mass of elastomeric material, preferably a cured dispersion of vinyl resins in the cavity in intimate contact with the ear. This universally mounts the stylus lever for movement as the function of recorded information, with the stylus lever having a substantially equal compliance in all directions of motion. Advantageously, the improved universal mount may be readily incorporated into a turret type assembly by the provision of two stylus levers mounted in a common mass of elastomeric materials, with the stylus levers extending in opposite directions and carrying styli appropriate for the playback of standard playing and long-playing records.

The above brief description, as well as further objects, features and advantages of the present invention will be more fully appreciated by reference to the following detailed description of an illustrative embodiment according to the persent invention, when taken in conjunction with the accompanying drawings, wherein:

FIG. 4 is a longitudinal sectional view taken substantially along the line 4—4 of FIG. 5, showing the details for the mounting of one of the two piezoelectric transducers;

FIG. 5 is a sectional view, on an enlarged scale and taken substantially along the line 5—5 of FIG. 2, showing the details of the coupling member which selectively couples one or the other of the stylus levers to the respective first and second transducers;

FIG. 6 is a sectional view, on an enlarged scale and taken substantially along the line 6—6 of FIG. 2 and looking in the direction of the arrows;

Figure 1:
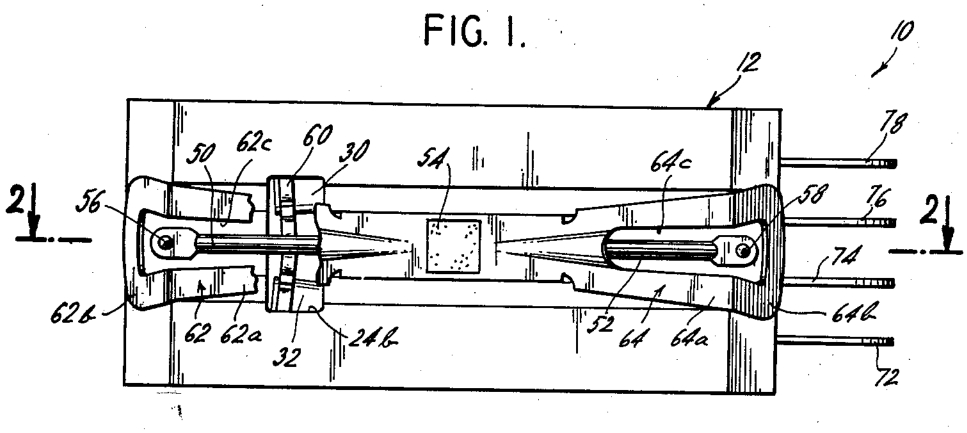
FIG. 1 is a bottom plan view of an electromechanical transducer for the reproduction of stereophonic recordings of sound embodying features of the present invention, with parts broken away for the purpose of illustration.

Referring now specifically to the drawings, there is shown an electromechanical transducer, generally designated by the reference numeral 10, and particularly designed for the playback or stereo discs or recordings cut on the 45/45 system. Although the illustrative form of the invention illustrates a stereophonic cartridge of the turret type suitable for playback of either 33⅓–45 r.p.m. records or 78 r.p.m. records, it will be appreciated that the invention finds application in stereophonic transducers of a single and double lever types without a turret and in monophonic transducers of the turret type and of the single and double lever types without a turret. The transducer or pickup 10 includes a bipartite casing or support 12 which includes a lower casing section 14 and an upper casing section 16 which are held together by straddling rivets 18, 20 extending through appropriately aligned rivet holes provided in the respective sections 14, 16 of the casing 12. The lower and upper casing sections 14, 16 abut on an inclined parting plane 22 (see FIG. 2) which is downwardly inclined from the right end of the bipartite casing 12 and terminates at a transversely extending cut-out 24 (see FIGS. 2 and 5). The cut-out 24 extends downwardly from an upper wall **24*a* formed in the upper casing section 12 and opens through the bottom wall of the lower casing section 16 at a rectangular opening 24*b* (see FIGS. 1 and 2). The bipartite casing 12 has a pair of side by side inclined chambers 26, 28 which are symmetrically disposed with respect to the vertical longitudinal center plane of the casing 12 and are provided in the lower and upper casing sections 14, 16 contiguous to and along the inclined plane 22. As seen in FIG. 5, the respective chambers 26, 28 open into the transversely-extending cut-out 24** and are each of rectangular cross-section.

The inclined chamber 26 receives a first piezoelectric transducer 30, while the inclined chamber 28 receives a second piezoelectric transducer 32. The transducers 30, 32 may be any one of the family of piezoelectric ceramic elements, such as of barium titanite or lead zirconium titanite, and are formed on opposite surfaces respectively with conducting electrodes **30*a*, 30*b* and 32*a*, 32*b* respectively. The respective transducers 30, 32 are commercially available and may be of the type sold by Clevite Electronics Components Division of Clevite Corporation under the trademark P2T Multimorph. The transducers 30, 32 are mounted in their respective chambers 26, 28 for flexion independently of each other by identical means and accordingly it will suffice to describe the mounting of the transducer 30 as illustrated in FIG. 4. Specifically, the transducer 30 is mounted within the chamber 26 by the provision of a pair of mounting grommets 34, 36 which have a rectangular outer section complementary to the rectangular cross-section of the chamber 26 and which are formed with openings of a section complementary to the section of the transducer 30. The mounting grommets 34, 36 may be of any appropriate elastomeric material, such as of rubber, and are seen to be located at the end of the transducer 30 remote from the end which projects into the transverse cut-out 24. The mounting grommets 34, 36 effectively provide a pivot for the transducer 30 which pivot is located intermediate the mounting grommets 34, 36 and enables the transducer to flex in response to motion imparted thereto at right angles to the electrodes 30*a*, 30*b* incident to tracking of the record by the stylus, as will be subsequently described. The material of the mounting grommets 34, 36** is selected to have the proper restoring force and damping properties, with any one of a number of known formulations having an appropriately controlled damping characteristic being suitable for the fabrication of such mounting grommets.

A combined stylus turret and guard assembly, generally designated by the reference numeral 38, is rotatably mounted on the casing or support 12 and is adapted to selectively arrange one of two stylus levers for coupling to the transducers 30, 32 for flexing the same as a function of the stereophonic recording. The stylus turret and guard assembly 38 includes an upstanding turret post 40 which is journaled in an upstanding through bore 42 formed in the casing 12 symmetrically of the longitudinal vertical center plane thereof and intermediate the respective transducer chambers 26, 28. The turret post 40 carries a knob (not shown) at its upper end and interposed between the knob and the upper surface of the upper section 16 of the casing 12 is a coil spring 44 which serves to bias the assembly 38 in the upward direction. As is generally understood, when the knob is depressed the turret assembly 38 may be rotated to bring one of two stylus levers into an operative position for tracking of a recording.

Figure 2:
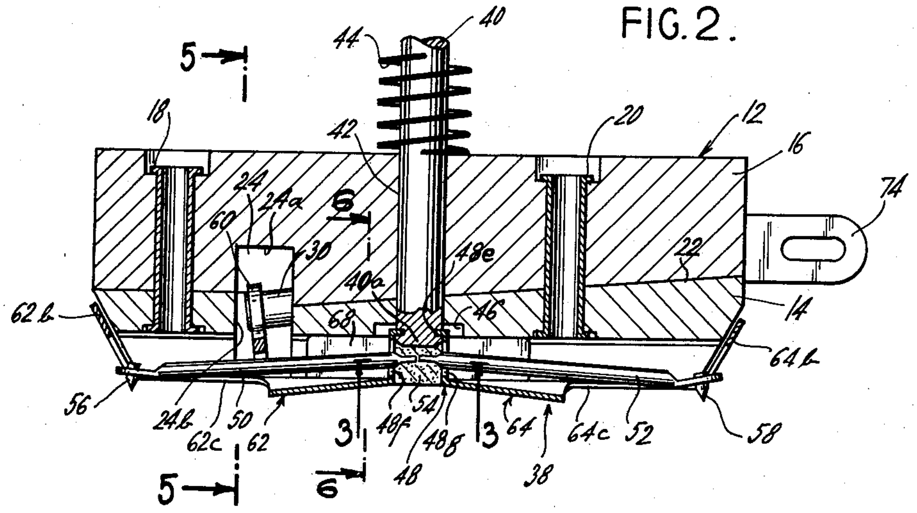
FIG. 2 is a sectional view taken substantially along the line 2—2 of FIG. 1 looking in the direction of the arrows and showing the internal structure of the transducer in a vertical and longitudinal center plane.
Figure 3:
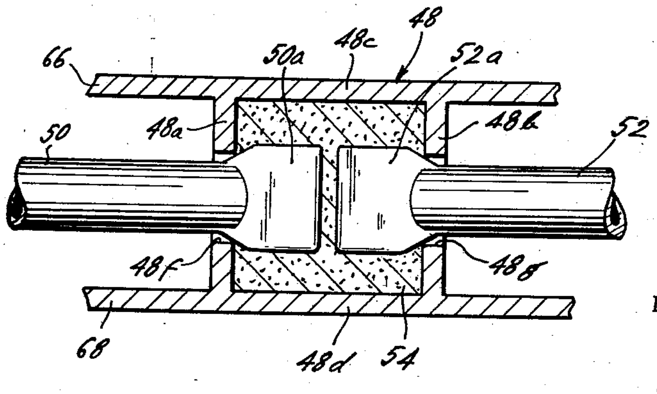
FIG. 3 is a fragmentary sectional view, on an enlarged scale and taken substantially along the lines 3—3 of FIG. 2, showing the mounting of the stylus levers of the stylus assembly.

In accordance with the present invention, the lower end of the turret post 40 extends below a counterbore 46 formed in the lower surface of the casing section 14 and carries a box-like mount 48. The box-like mount 48 provides a universal suspension for the inner end of the respective stylus levers 50, 52 which extend longitudinally of the pickup in opposite directions from the mount 48. As seen in FIGS. 2 and 3, the box-like mount 48 includes four upstanding walls, designated in FIG. 3 by the reference characters **48*a*, 48*b*, 48*c* and 48*d* and a top wall 48*e* (see FIG. 2) formed with a centrally disposed circular opening. The box-like mount 48 is secured to the lower end of the turret post 40 by the provision on the lower end of the turret post 40 of a rivet portion 40*a* which is initially projected through the complementary circular opening in the top wall 48*e* of the mount and is peened over, as seen in FIG. 2, to secure the mount 48 to the turret post 40. The opposite end walls 48*a*, 48*b* of the mount 48 are formed with substantially diamond-shaped openings 48*f* and 48*g* which receive, respectively, inner flattened ends or ears 50*a*, 52*a* of the stylus levers 50, 52 as seen best in FIGS. 3 and 6. The width of the respective ears 50*a*, 52*a* is somewhat greater than the width of the respective diamond-shaped openings 48*f*, 48*g* such that the ears 50*a*, 52*a*, when vertically oriented, may be inserted into the respective openings 48*f*, 48*g* and then rotated through 90° to the assembled positions illustrated in FIGS. 3 and 6 wherein the ears of the stylus levers 50, 52 cannot be removed from within the box mount 48. The universal mounting for the stylus levers 50, 52 which are recognized as being simple levers, is completed by filling the box-like mount from its opened bottom with an elastomeric mounting body, generally designated by the reference numeral 54**. The elastomeric mounting body may be a dispersion of vinyl resins which cures to set up an elastomeric mass.

In this illustrative embodiment, the outer end of the stylus lever 50 carries a stylus 56 which is appropriate for the playback of long-playing records which operate at speeds of either 33⅓ r.p.m. or 45 r.p.m., while the stylus lever 52 carries a stylus 58 which is appropriate for the playback of regular-playing records operated at 78 r.p.m. In the illustrated position, the stylus lever 50 and the long-playing stylus 56 are in the operative position and are connected to the respective transducers 30, 32 by a coupling member, generally designated by the reference numeral 60. As seen best in FIG. 5, the coupling member 60 includes a main body or yoke **60*a* which is formed with a downwardly opening seat or saddle 60*b* which is adapted to embrace and operatively engage one or the other of the simple stylus levers 50, 52. Integral with the body or yoke 60*a* are coupling arms 60*c*, 60*d* which extend at right angles to each other and to the respective electrode pairs 30*a*, 30*b* and 32*a*, 32*b* of the transducers 30, 32. The coupling arm 60*c* is connected to a coupling collar 60*e* which surrounds and engages the end of the transducer 30 in the cutout 24, with a reduced neck or pivot 60*f* being formed intermediate the coupling arm 60*c* and the coupling collar 60*e*. In a similar fashion, the coupling arm 60*d* is connected to a coupling collar 60*g* which surrounds and engages the adjacent end of the transducer 32, with a reduced neck or pivot 60*h* being formed intermediate the coupling arm 60*d* and the coupling collar 60*g*. The coupling member 60 is of one-piece construction and is fabricated of a material having a Young's modulus of stiffness in the range of nylon and is dimensioned to have a high compliance to lateral forces and a relatively low compliance to longitudinal forces along the respective coupling arms 60***c*, 60*d*. It will be appreciated that when the stylus 56 on the stylus lever 50 tracks the groove cut in the stereo disc, there will be a compound motion imparted to the coupling member 60 which should be selectively transmitted to the respective transducers 30, 32. Motion components acting at an angle of 45° and longitudinally of the coupling arm 60*c* should be transmitted to the transducer 30, with relatively no motion transmission to the transducer 32; and conversely motion components acting at an angle of 45° and longitudinally of the coupling arm 60*d* should be transmitted to the transducer 32, with relatively no motion imparted to the transducer 30. Due to the reduced neck section or pivot 60*h*, axial or longitudinal forces along the coupling arm 60*c* which are to flex or stress the transducer 30 will not be transmitted to the transducer 32 in that the coupling member will tend to pivot on the reduced neck 60*h* since the longitudinal force along the coupling arm 60*c* will represent a lateral force on the coupling arm 60*d*. Such lateral force produces substantially no flexure of the transducer 32 in that the coupling system 60*d*, 60*h* has a high compliance in the lateral direction. Conversely axial or longitudinal forces along the coupling arm 60*d* cause the coupling member to tend to pivot or swing about the reduced neck 60*f*. Thus as a practical matter the coupling member 60 produces a resolution of the complex motion imparted thereto from the stylus lever 50 and independently stresses or activates the respective transducers 30, 32 as functions of the related modulations.

The illustrative assembly 38 includes integral stylus guards 62, 64 which extend in opposite directions from the box-like mount 48 and protect the respective stylus levers 50, 52 and their styli 56, 58. The stylus guards 62, 64 are formed as part of an integral stamping with the box-like mount 48 and as seen in FIG. 1 include main sections having upturned terminal sections 62*b*, 64*b*. The sections 62*a*, 62*b* and 64*a*, 64*b* are provided respectively with longitudinal cut-outs 62*c*, 64*c* to provide clearance for the operation of the respective stylus levers 50, 52 and their styli 56, 58. The stylus guards 62, 64 serve a protective function during both play of a record and during change-over of the stylus assembly.

In order to properly orient the stylus turret and guard assembly 38 with either of the stylus levers 50, 52 in the operative position in relation to the coupling member 60, there is provided integral with the box-like mount 48 and the guard 62, 64 a pair of longitudinally-extending, side by side orienting flanges 66, 68 (see FIGS. 2, 5 and 6) which flanges are spaced apart and received within appropriate orienting seat 70 (see FIG. 6) formed in the under surface of the lower section 14 or the casing 12. Upon depressing the turret shaft 40 against the spring 44, the orienting flanges 66, 68 are removed from their engaged position within the orienting seat 70 and may be moved to a clearance position with respect to the lower casing section 14 whereupon it is possible for the user to turn the entire turret assembly 38 end for end to bring the other stylus lever 52 and its stylus 58 into the operative position engaging the coupling member 60 of the transducer 12. When the turret assembly 38 is turned end for end, the orienting flanges 66, 68 reengage within the seat 70 to establish the requisite orientation or positioning of the changed-over stylus lever in relation to the coupling member 60.

Appropriate electrical connections are provided to the respective electrodes or conductive plates of the transducers 30, 32 by the provision of 4 terminals 72, 74, 76, 78 on the casing which terminals project from one end of the casing and are individually connected to the respective electrodes 30*a*, 30*b*, 32*a* and 32*b*. The connections of the respective terminals to the electrodes are identical and may all be similar to that illustrated in FIG. 4 wherein it is seen that the terminal 72 is provided with an integral tab 72*a* which is soldered or otherwise electrically connected to the adjacent end of the electrode 30*a* of the transducer 30. In turn, the terminals 72, 74, 76 and 78 are electrically connected to the tone arm of the phonograph and cartridge 10 is mounted in accordance with known techniques.

Figure 7:
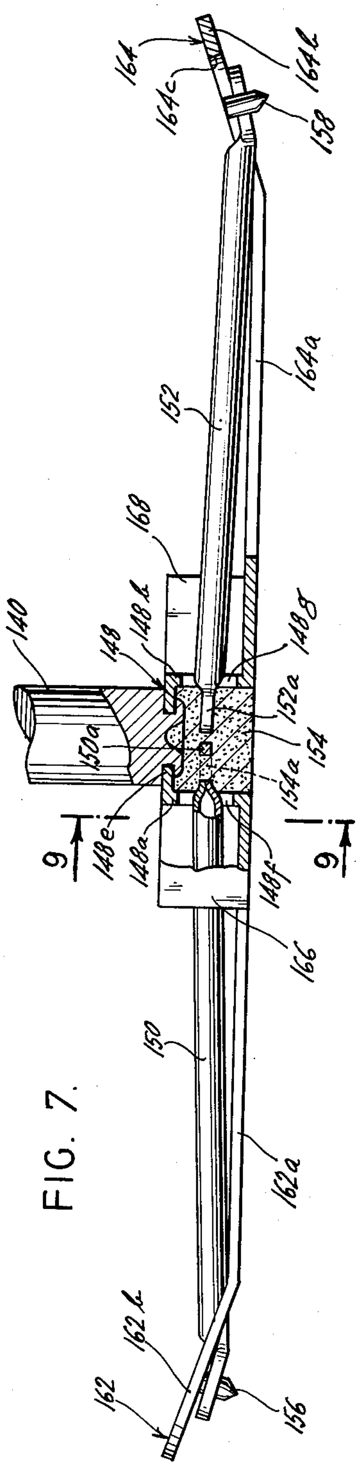
FIG. 7 is a side elevational view, on an enlarged scale and with parts broken away, of a modified form of turret type of stylus assembly embodying further features of the present invention.
Figure 8:
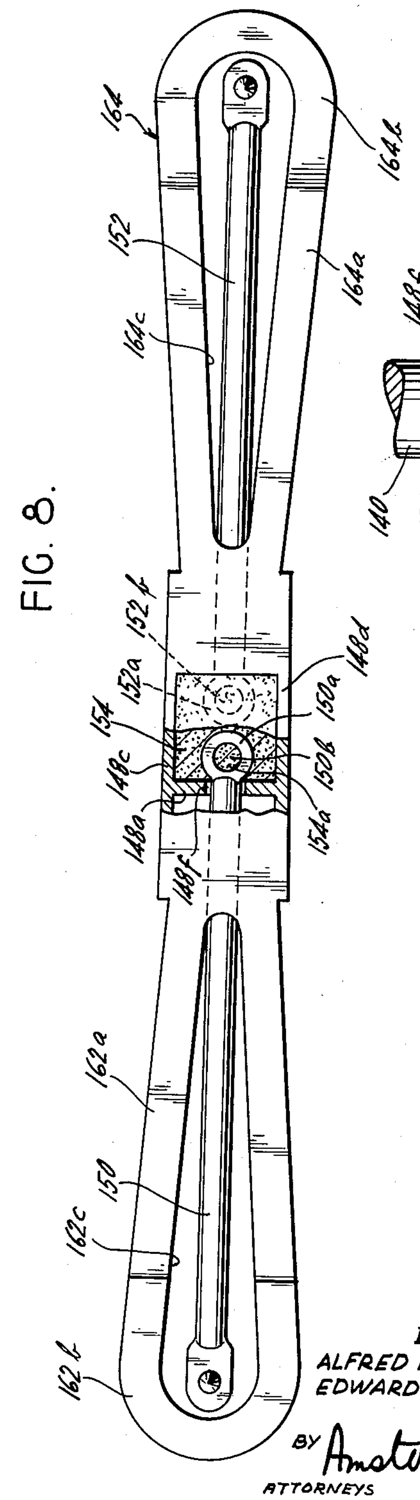
FIG. 8 is a bottom plan view of the modified form of turret type assembly shown in FIG. 7; and, FIG. 9 is a sectional view taken substantially along the line 9—9 of FIG. 7 and looking in the direction of the arrows.
Figure 9:
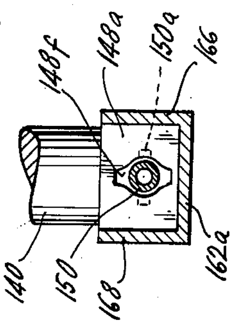

Reference will now be made to FIGS. 7–9 inclusive for a description of a turret type of stylus lever assembly demonstrating further features of the present invention. In this form of the invention, provision is made for decreasing any tendency which might exist for the flattened ears to strip away from the cured mass of elastomeric material and enable the one or more stylus levers to rotate on their axes and to take on skewed positions wherein the respective styli would be improperly oriented for playback of recordings. As a further aspect of this illustrative embodiment a control is provided whereby the ratio of vertical to lateral compliance of the stylus levers may be varied, if required. In that the present illustrative embodiment is similar in many material respects to the embodiment illustrated in FIGS. 1–6 inclusive, the reference numerals have been selected as part of a "100" series. Specifically, the lower end of the turret post 140 carries a box-like mount 148 which provides a universal suspension for the inner ends of the respective stylus levers 150, 152 extending longitudinally of the pickup in opposite directions from the mount 148. As seen best in FIGS. 8 and 9, the box-like mount 148 includes four upstanding walls, designated by the reference numerals 148*a*, 148*b*, 148*c* and 148*d*, and a top wall 148*e* (see FIG. 7) formed with a centrally disposed circular opening through which the turret post 140 extends and is riveted to the mount 148. The opposite end walls 148*a*, 148*b* of the box-like mount 148 are formed with openings 148*f*, 148*g* which respectively receive the inner flattened ends or ears 150*a*, 152*a* of the stylus levers 150, 152. In this illustrative embodiment, the openings 148*f*, 148*g* are essentially of keyhole configuration and characterized by having a longitudinal extent which is greater than the lateral extent or diameter of the substantially circular ear 150*a*, 152*a* and a transverse extent which is smaller than the diameters of the substantially circular ears 150*a*, 152*a*. Accordingly, the ears may be disposed within the cavity of the box-like mount 148 by aligning the ears with the longer dimension of the keyhole opening 148*f*, 148*g*, inserting the same therethrough, and then turning the ears approximately 90° to a position substantially transverse to the longitudinal dimension of the openings 148*f*, 148*g*. The modified configuration of the keyhole in no way affects the design but has been found to increase the life of the piercing dies and tools which are employed in fabricating the mount assembly. After completing the assembly of the respective stylus levers 150, 152, the interior or cavity of the mount is filled with a cured dispersion of vinyl resin, generally designated by the reference numeral 154, which sets up into an elastomeric body yieldably mounting the respective stylus levers 150, 152.

As a feature of this modified turret assembly, the flattened ears 150*a*, 152*a* are provided with one or more apertures 150*b*, 152*b* such that the elastomeric mass 154 includes integral extensions, such as 154*a* (see FIG. 7) through the apertures. With this arrangement, there is a somewhat decreased tendency for the flattened ears to strip away from the cured elastomeric mass which might enable the stylus levers to rotate on their axes and take up undesired positions. Also the ratio of vertical to lateral compliance of the respective stylus levers may be controlled by the appropriate selection of the diameter and number of the apertures or holes provided in the mounting ears 150*a*, 152*a*.

From the foregoing it will be appreciated that there has been provided a universal mount for a stylus assembly which enables the mounting of one or more stylus levers such that there is substantially no sidewise movement of the levers about their effective pivots. However, the stylus levers are free to move in all directions about the pivot with a high order of compliance. Further, by appropriate selection of the elastomeric mass surrounding the one or more stylus levers, a relatively small restoring force is required to bring the stylus levers back to a position in engagement with the coupling system of a turret type assembly. Further, there is a relatively strong torsional or rotational restoring force which keeps the levers in their desired position and precludes tilting in relation to the record surface, which restoring force may be supplemented by employing apertured ears as disclosed in the modified form of the invention. Further, it will be appreciated that the functional drag of the stylus in the record groove during playback is such as to urge the respective ears into intimate contact with the adjacent walls of the box-like mount to thereby preclude transverse motion of the stylus levers.

Although the invention has been illustrated in its specific application to a stereophonic transducer of the turret type, it will be recognized that the teachings herein find useful application in other types of cartridges wherein it is necessary to universally mount one or more stylus levers for movement as a function of the tracking of their respective stylus in a groove or cut in a recording disc.

A latitude of modification, change and substitution is intended in the foregoing disclosure, and in some instances some features of the invention will be employed without a corresponding use of other features. Accordingly it is appropriate that the appended claims be construed broadly and in a manner consistent with the spirit and scope of the invention herein.

What we claim is:

1. A universal mount for a stylus lever of an electromechanical transducer comprising support means defining a cavity including a wall formed with an elongated opening, a stylus lever including an elongated lever arm terminating at one end in a flattened ear, a stylus on the other end of said lever arm and oriented for playback of a record when said ear extends substantially transverse to said elongated opening, said ear being disposed within said cavity and the transverse extent of said ear being greater than the transverse extent of said opening to preclude withdrawal from said cavity when said stylus is oriented for playback, and a mass of elastomeric material in said cavity in intimate contact with said ear.

2. A universal mount in accordance with claim 1 wherein said mass of elastomeric material is a dispersion of vinyl resins.

3. A universal mount in accordance with claim 1 wherein said ear is provided with at least one aperture and said mass includes an integral extension through said aperture, the cross-section of said aperture being selected to establish a prescribed ratio of vertical to lateral compliance for said lever arm.

4. A universal mount for a stylus lever of an electromechanical transducer comprising support means defining a cavity including a wall formed with an elongated vertically extending opening, a stylus lever including an elongated lever arm terminating at one end in an ear of a lateral extent greater than said lever arm, a stylus on the other end of said lever arm and oriented for playback of a record when said ear extends substantially horizontally, said ear being disposed within said cavity and extending substantially horizontally after being vertically oriented, inserted through said opening and turned approximately 90°, the transverse extent of said ear being greater than the transverse extent of said opening to preclude withdrawal from said cavity when said stylus is oriented for playback, and a mass of elastomeric material in said cavity in intimate contact with said ear.

5. A universal mount for a stylus lever of an electromechanical transducer comprising support means defining a cavity including a wall formed with an elongated vertically extending opening, a stylus lever including an elongated lever arm terminating at one end in an ear of a lateral extent greater than said lever arm, a stylus on the other end of said lever arm and oriented for playback of a record when said ear extends substantially horizontally, said ear being disposed within said cavity and extending substantially horizontally after being vertically oriented, inserted through said opening and turned approximately 90°, the transverse extent of said ear being greater than the transverse extent of said opening to preclude withdrawal from said cavity when said stylus is oriented for playback, and a mass of cured vinyl resin in said cavity in intimate contact with said ear.

6. A universal mount for a stylus lever of an electromechanical transducer comprising support means defining a cavity including a wall formed with an elongated vertically extending opening, a stylus lever including an elongated lever arm terminating at one end in an ear of a lateral extent greater than said lever arm, said ear being formed with at least one hole extending therethrough, a stylus on the other end of said lever arm and oriented for playback of a record when said ear extends substantially horizontally, said ear being disposed within said cavity and extending substantially horizontally after being vertically oriented, inserted through said opening and turned approximately 90°, the transverse extent of said ear being greater than the transverse extent of said opening to preclude withdrawal from said cavity when said stylus is oriented for playback, and a mass of elastomeric material in said cavity in intimate contact with said ear and filling said hole.

7. A universal mount in accordance with claim 6 wherein said mass of elastomeric material is a cured dispersion of vinyl resins.

8. A stylus lever mount comprising a box-like support including opposed upstanding walls each having an elongated vertical-extending opening formed therein, first and second stylus levers each having a flattened ear at one end thereof, said ears being dimensioned in relation to the length of said openings to be insertable into said openings when extending lengthwise thereof, said ears when inserted through said openings and being received within said box-like support being oriented to extend transversely of said openings, said ears being dimensioned in relation to the width of said opening such that said ears are blocked against withdrawal from said openings when extending transversely thereof, and an elastomeric fill in said box-like support in intimate contact with said ears and mounting said first and second stylus levers on said box-like support for independent universal movement.

9. A mount in accordance with claim 8 wherein said ears are each provided with at least one aperture and said mass includes integral extensions through said apertures, the respective cross-sections of said apertures being selected to establish prescribed ratios of vertical to lateral compliance and a prescribed ratio of vertical to lateral to rotational compliance for said first and second stylus levers.

10. A stylus lever mount comprising a box-like support including at least one wall having an elongated opening formed therein, a stylus lever having a flattened ear at one end thereof, said ear being provided with at least one aperture, said ear being dimensioned in relation to the length of said opening to be insertable into said opening when extending lengthwise thereof, said ear when inserted through said opening and being received within said box-like support being oriented to extend transversely of said opening, said ear being dimensioned in relation to the width of said opening such that said ear is blocked against withdrawal from said opening when extending transversely thereof, and a mass of elastomeric material in said box-like support in intimate contact with said ear and mounting said stylus lever on said box-like support for universal movement, said mass including an integral extension through said aperture of said ear, and the cross section of said aperture of said ear being selected to establish a prescribed ratio of vertical to lateral compliance and a prescribed ratio of vertical to lateral to rotational compliance for said stylus lever.

References Cited in the file of this patent

UNITED STATES PATENTS

| | | |
|---|---|---|
| 2,702,317 | Palo | Feb. 15, 1955 |
| 2,849,239 | Dieter | Aug. 26, 1958 |